FIG.1

Jan. 10, 1956   H. G. STALLKAMP   2,730,080
VAPOR GENERATING INSTALLATION, INCLUDING A CYCLONE FURNACE
Filed Dec. 6, 1950   6 Sheets-Sheet 2

INVENTOR
*Hubert G. Stallkamp*
BY
*V. W. Holbrook* ATTORNEY

INVENTOR
Hubert G. Stallkamp
BY
ATTORNEY

Jan. 10, 1956        H. G. STALLKAMP        2,730,080

VAPOR GENERATING INSTALLATION, INCLUDING A CYCLONE FURNACE

Filed Dec. 6, 1950        6 Sheets-Sheet 6

FIG. 7

INVENTOR
Hubert G. Stallkamp
BY
     ATTORNEY

United States Patent Office 2,730,080
Patented Jan. 10, 1956

2,730,080

VAPOR GENERATING INSTALLATION, INCLUDING A CYCLONE FURNACE

Hubert G. Stallkamp, Bala-Cynwyd, Pa., assignor to The Babcock & Wilcox Company, Rockleigh, N. J., a corporation of New Jersey Application December 6, 1950, Serial No. 199,442

3 Claims. (Cl. 122—235)

This invention relates to vapor generating installations of high capacity. It is more particularly concerned with such installations which include fuel burning means operating at high temperatures and at high rates.

In the more specific sense, the invention is concerned with a steam or vapor generating installation including a cyclone furnace. In such a furnace the refractory material of the furnace surfaces, and particularly at the gas outlet of the furnace, must not only be of sufficient heat resistance to withstand the high temperatures involved, but it must also be able to withstand the erosion and attendant chemical effects caused by the impact on the refractory surfaces of the flames and furnace gases, under high velocity conditions. In addition, certain parts of the surfaces of such furnaces are subject to the impact and erosion effect of molten ash particles carried in suspension in the furnace gases. To maintain the refractories at such positions, this invention involves water circulating and vapor generating tubes in close association with the refractory material at the throat or gas outlet of the primary furnace chamber of the cyclone furnace, and the tubes are so arranged that there are optimum conditions pertaining to the flow of cooling fluid through the tubes. For example, in the practice of the invention, such tubes are so arranged as to have independent flows of cooling fluid therethrough from a lower drum of a steam generator to the upper drum. No headers are interposed in the tube circuits.

The invention also involves such tube constructions associated with a cyclone furnace and a furnace chamber in such a way that pairs of tubes enhancing the maintenance of refractory subject to the cyclone furnace conditions are united by bifurcations or Y-connectors with larger diameter wall tubes of the furnace chamber at positions along a wall of the latter, to promote optimum flow of cooling fluid through the tubes, and thereby promote optimum maintenance of the refractory subject to the conditions of the cyclone furnace.

The invention will be herein described with reference to the accompanying drawings in which a preferred embodiment of the invention is illustrated.

The drawings indicate a high capacity steam generating and superheating installation operating at a steam pressure of the order of 1800 p. s. i., and at a capacity of 500,000 lb. per hour. The installation involves a steam superheater and reheater each delivering steam at 1000° F.

Figure 1:
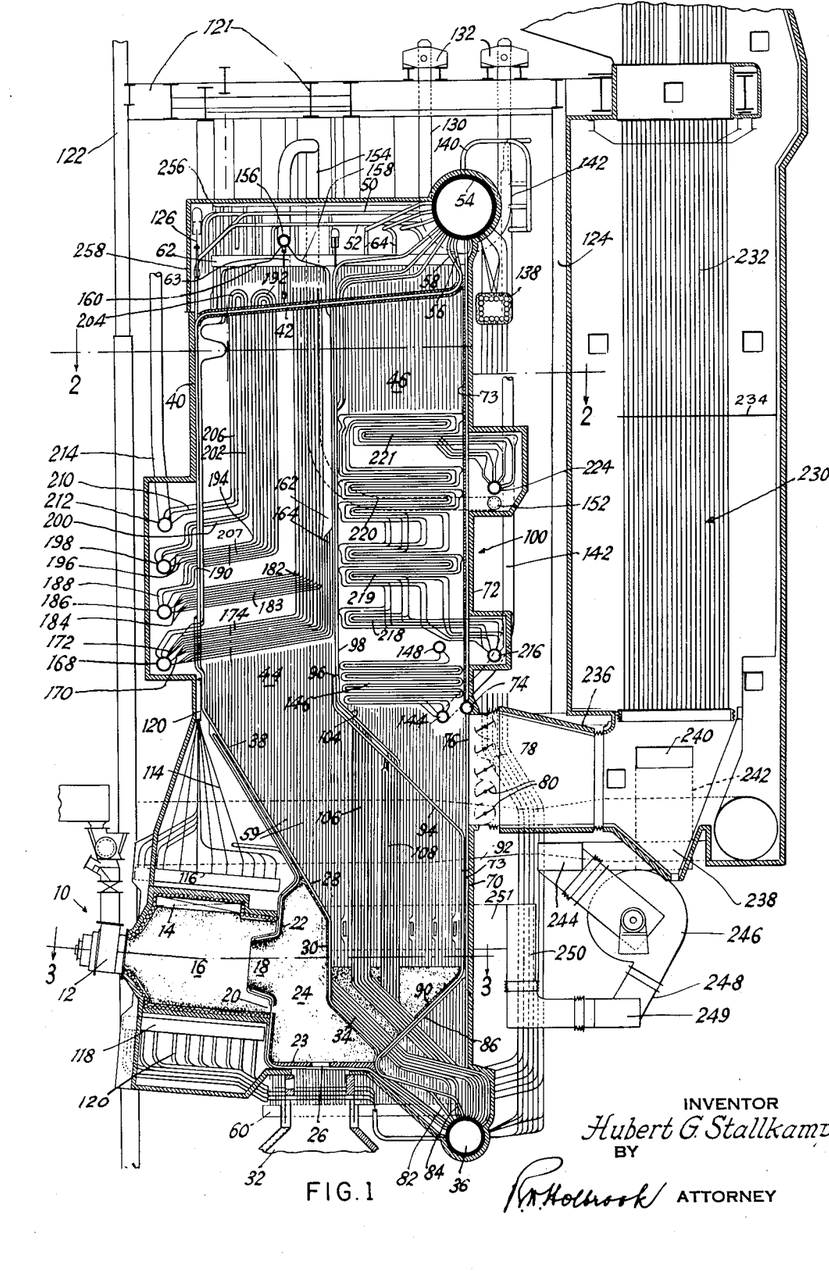
Fig. 1 is a vertical section through the illustrative installation.

The illustrative installation involves fuel burning means including a cyclone furnace generally indicated at 10 in Fig. 1. This furnace is characterized by high combustion efficiency and a recovery of a high percentage (90–95%) of the recoverable portion of the fuel ash in the formation of molten slag. The cyclone furnace and its associated components are constructed and arranged in a manner similar to that indicated in the U. S. patent to Bailey et al. 2,357,301, September 5, 1944. In the operation of the furnace, crushed coal and a supply of preheated primary air under superatmospheric pressure are delivered tangentially to the cyclone furnace at the inlet 12. This introduction of primary air and coal to the furnace takes place at a velocity high enough to cause the coal particles to be thrown toward the cyclindrical wall of the cyclone which is formed by fluid cooled studded tubes covered on their inner sides by high temperature refractory material. High temperature secondary air is admitted to the cyclone through the inlet 14 in a path generally parallel to the path of movement of the primary air and coal. The temperature of the products of combustion in the cyclone furnace is high enough to melt the ash into liquid slag which clings to the wall of the furnace. The particles of incoming coal are trapped in this surface layer of molten ash, and the scrubbing action of the high velocity combustion air over these coal particles results in effective combustion at high fuel burning rates.

The combustion gases with slag particles therein exit from each cyclone furnace chamber 16 through its outlet 18 in a turbulent condition, and slag formed and accumulated in this cyclone chamber 16 passes through the slag opening 20 formed by outward bends in some of the fluid cooled tubes defining the rear wall 22 of the cyclone. Slag flowing through the opening 20 drops to a slag pool on the floor 23 of the primary furnace chamber 24, from which it passes through an opening 26 and drops into a body of water within the slag pit or tank 32.

The upper and rearward wall of the primary furnace chamber of the cyclone furnace is defined by steam generating tubes 28 connected into the fluid circulation system of the installation. Parts of these tubes, with their covering of refractory on their furnace sides form the reflecting arch 30. This arch is also a division wall separating the primary furnace chamber 24 from the secondary furnace chamber 44. It is so related to the furnace floor and to other adjacent walls that it forms a throat or gas outlet across which platens 34 extend. This throat establishes communication between the primary and secondary furnace chambers. Below this arch, the steam generating tubes are bent to form the transversely spaced platens of a slag screen 34, disposed at an angle of approximately 45° to the horizontal as indicated in the drawings. These platen forming tubes extend downwardly and have their lower ends directly connected to the submerged lower drum 36. Above the reflecting arch 30 these tubes extend vertically from the top of the inclined boundary surface 38. They extend along the secondary furnace chamber wall 40 to positions near the top of the installation. Some of these tubes have roof sections 42 associated with heat resistant material to form the roof of the radiant heat absorption furnace chamber (or secondary furnace chamber) 44 and the downward gas pass 46. Others of the tubes disposed along the wall 40 extend above the roof of the furnace chamber 44, and then horizontally through their circulator sections 50 and 52 to direct connections with the steam and water separating drum 54. The roof tubes similarly have their upper ends 56 and 58 directly connected with the water space of the drum 54.

Figure 7:
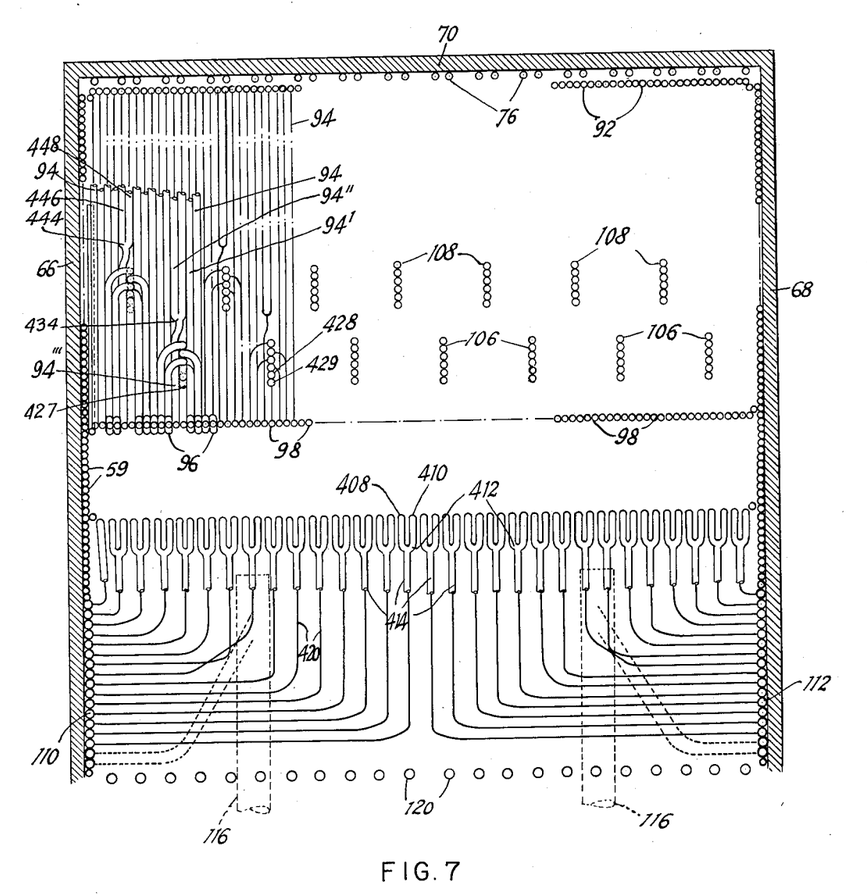
Fig. 7 is a composite multi-plane view in the nature of a multiple plan section, the lower part of this view, and the right hand portion of the upper part being taken along the section line 7A—7A of Fig. 6, and the left hand portion of the upper part being taken on the planes of the section line 7—7 of Fig. 6.

The lower ends of the tubes defining the division wall separating the cyclone chamber 16 from the primary furnace chamber 24 are connected to the lower drum 36 in rows as indicated at 402 and 404. These tubes extend upwardly at a horizontal inclination to the floor of the primary furnace chamber 24, then horizontally along that floor as indicated at 406 and then upwardly through the wall 22. At positions just above the latter wall, pairs of these tubes or tube sections such as 408 and 410 are united by Y-connectors such as 412 with larger diameter tubes 414 at positions beneath the inclined wall 38. These larger diameter tubes extend forwardly of the installation for variable distances, and they are then bent so as to extend toward the sides of the installation where they continue upwardly as the large diameter side wall tubes, such as 110, for the secondary furnace chamber 44. As indicated in Fig. 7 about half of the large diameter tubes 414 extend to the left hand side wall 66 while the remainder of these tubes extend to the right hand side wall 68 where they continue upwardly as the large diameter wall tubes 112.

Some of the tubes of the wall 22 have Y-connectors such as 418 extending to the left away from the wall 38 (Fig. 6) into large diameter tubes 420 which are then bent upwardly to continue as some of the side wall tubes such as 110' and 110". Each of the wall tubes 110', 110" etc. has its separate section similar to the section 420. Just to the left of these tubes are indicated tubes 120 which lead upwardly from the upper header 116 of the cyclone.

Gaseous combustion products with their suspended molten particles flow from the primary furnace chamber 24 through an outlet beneath the reflecting arch 30, and between the tube platens 34 into the lower part of the secondary furnace chamber 44. They pass upwardly through the latter and between widely spaced platens of contiguous radiant superheater tubes distributed across the furnace chamber 44. They then turn to the right and flow horizontally into the equalizing chamber at the top of the downpass 46 and over the components of tubes constituting a reheater and a primary superheater disposed in the gas pass.

The remaining walls of the secondary furnace chamber 44 are defined by steam generating tubes having their lower ends appropriately connected to the lower drum 36, and their upper ends connected to the steam and water drum 54. The side walls are defined by steam generating tubes 59 (Fig. 2) directly connected at their lower ends to transverse headers, such as the header 60 at the lower part of Fig. 1, this header being appropriately in communication with the drum 36 by suitable tubular connectors. The upper ends of the side wall tubes are connected with the horizontally disposed and diaphragmed headers such as 62 directly connected to the drum 54 by circulators 64.

Figure 2:
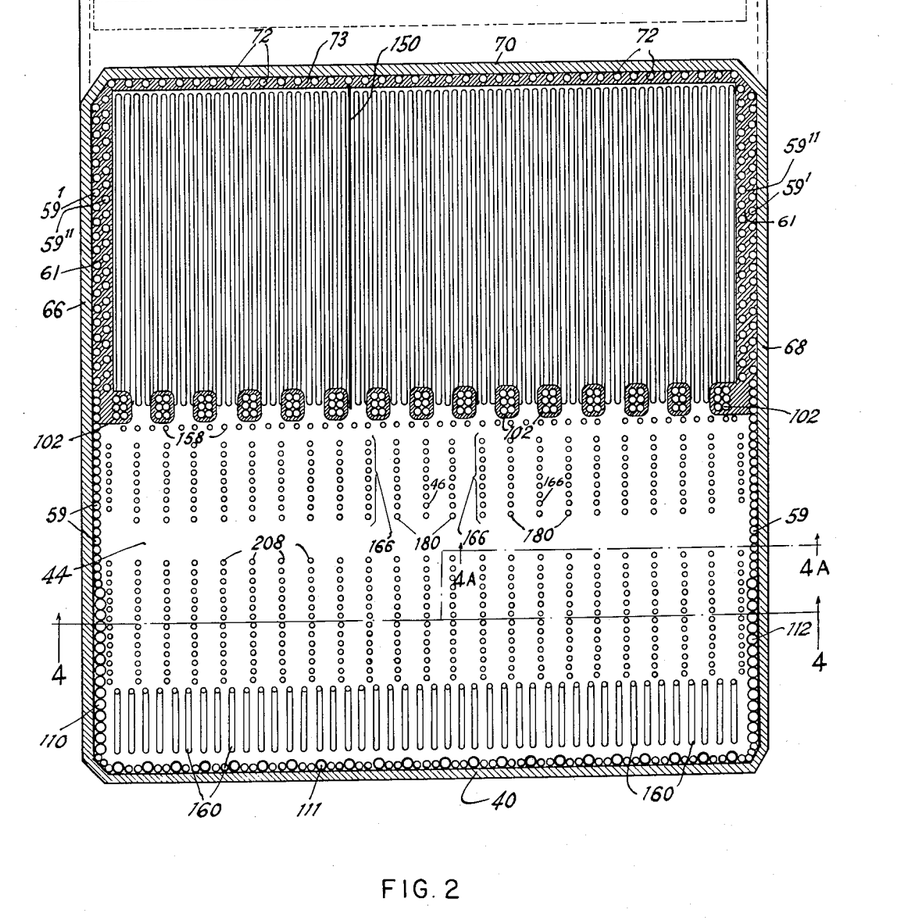
Fig. 2 is a horizontal section on the section line 2—2 of Fig. 1, looking in the direction of the arrows.
Figure 3:
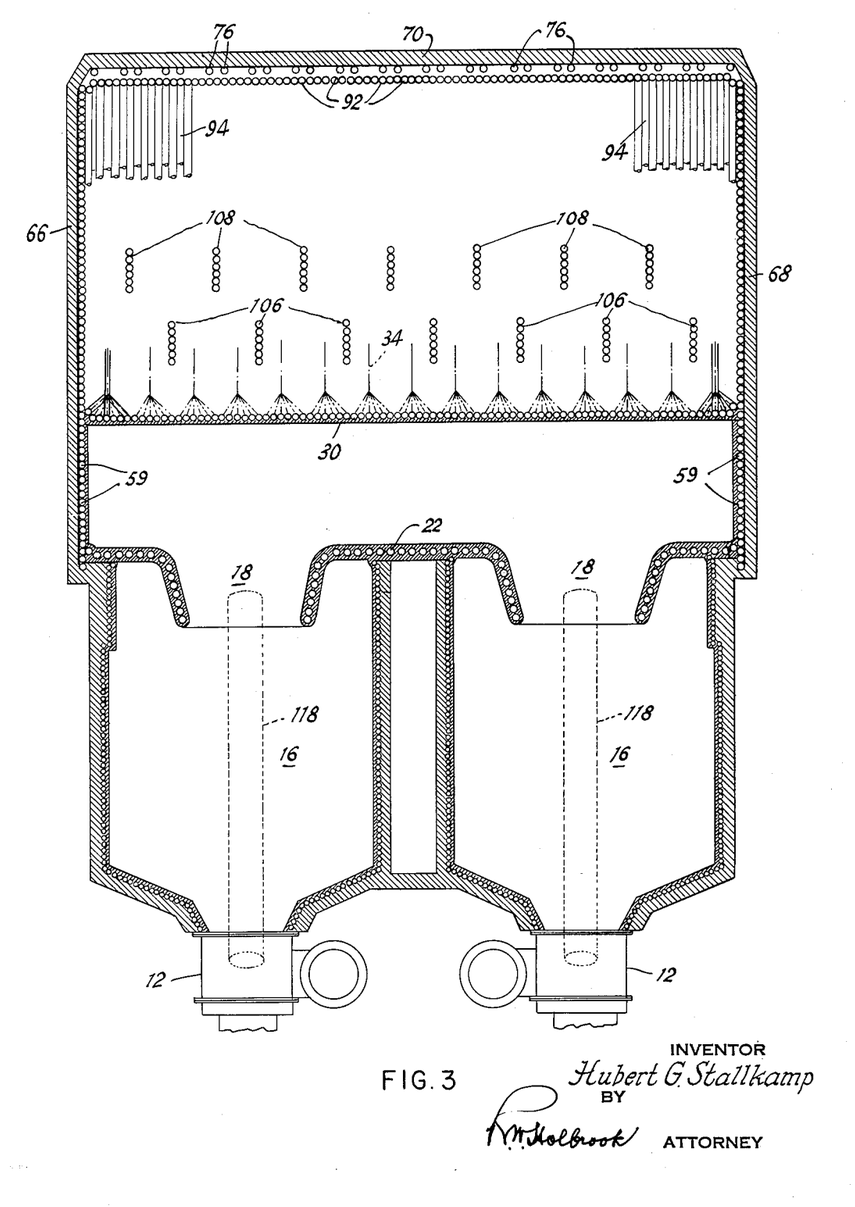
Fig. 3 is a horizontal section on the line 3—3 of Fig. 1.

At the upper part of the installation, as shown in Fig. 2, the upper parts of tubes 59 are arranged in two rows so that they may be covered with the intervening refractory material 61 to reduce heat absorption by the tubes and thereby maintain high temperatures of the furnace gases at the positions of the reheater 100 and the primary superheater. In Fig. 2 the two rows of upper parts of the tubes 59 are indicated at 59' and 59".

The installation is generally rectangular in horizontal section as indicated in Fig. 2, having the front wall 40, the side walls 66 and 68, and the rear wall 70. The latter includes steam generating wall tubes 72 connecting the intermediate transverse header 74 directly to the drum 54. Above this header the tubes 72 are covered with refractory material 73 to further promote high gas temperatures. Immediately beneath the header 74 the wall tubes 76 extend in spaced relationship across the gas outlet 78 of the downpass 46. The flow of gas through the reheater part of this outlet is controlled by a plurality of dampers 80. The tubes 76 extend downwardly below the gas outlet 78, and along the wall 70 to direct connection with the drum 36. The wall 70 includes the heat insulating material disposed externally of the tubes 76 as well as the refractory material 73 disposed on the gas sides of the tubes 72 and 76.

Other steam generating tubes have their lower ends 82 and 84 directly connected to the drum 36, and their inclined sections 86 associated with the refractory material 90 to form an inclined wall extending downwardly toward the floor 23 of the primary furnace chamber 24. Above this inclined section, these tubes have the upright portions 92 extending along the lower part of the wall 70. Next above these are the inclined sections 94 associated with other tube sections and refractory material to form an inclined base for the downward gas pass 46. Beyond this base these tubes are joined by bifurcations 96 to upright portions 98 disposed along the division wall separating the upper part of the secondary furnace chamber 44 from the downward gas pass 46. The bifurcations 96 might also be regarded as Y-connections with each of the tubes 98 being joined by such a Y-connection with two of the tubes such as 104 and 94. Above the level of the reheater, generally indicated at 100, sections of tubes 98 form parts of the refractory covered groups of tubes 102 spaced across the gas flow from the top of the furnace chamber 44 to the top of the gas pass 46. These refractory covered groups of tubes 102 are constructed and arranged so as to minimize heat absorption by the tubes at the outlet of the furnace chamber 44. This promotes higher furnace gas temperatures at the positions wherein the furnace gases turn downwardly at the top of the downflow gas pass and contact the banks of tubes of the reheater and the primary superheater. The other tubes in these groups 102 lead from bifurcations similar to 96. The upper legs 104 of these bifurcations continue downwardly as tubes of the platens 106 and 108 which extend vertically through the lower part of the furnace chamber 44. At the lower ends of these platens, the component tubes extend through the inclined wall including tube sections 86 and 88, to direct connection with the drum 36 as clearly indicated in the drawing.

Figure 6:
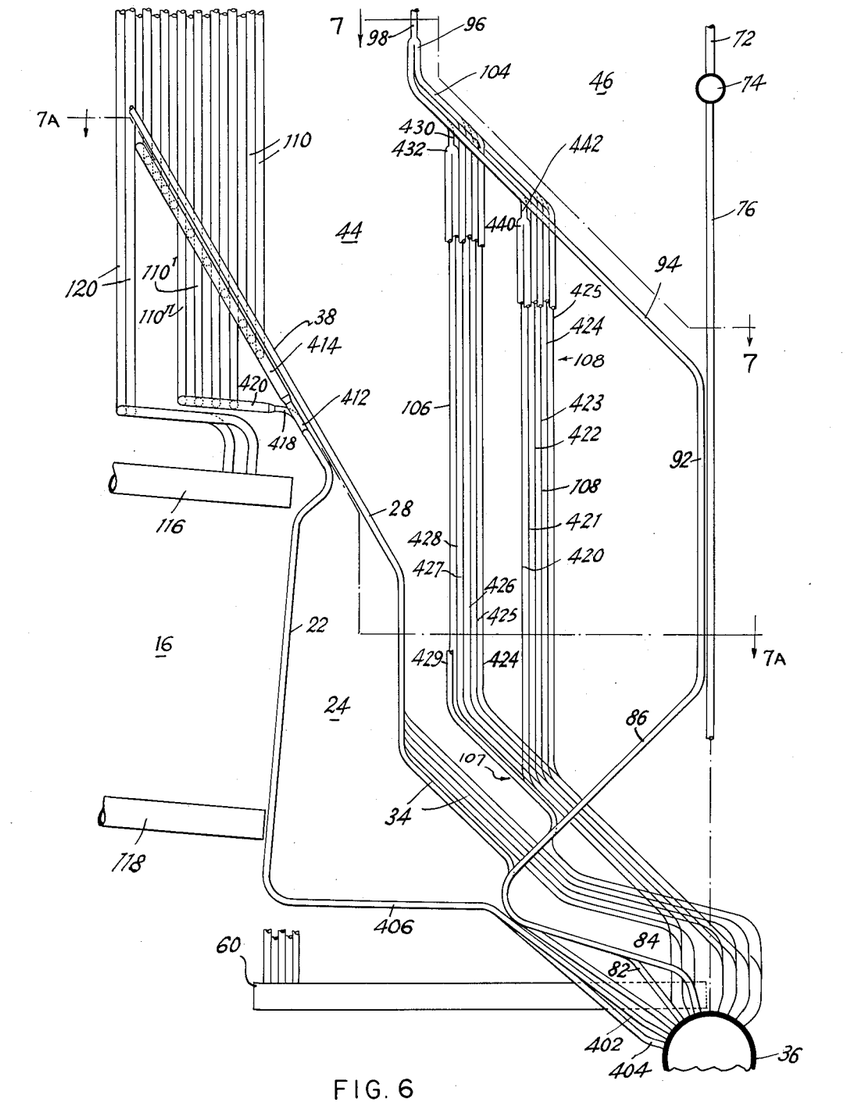
Fig. 6 is a fragmentary view of the lower part of the installation showing the arrangement of the tubular connections leading upwardly from the cyclone furnace and leading upwardly from the upright platens extending through the lower part of the furnace chamber.

Referring particularly to Fig. 6, the separate tubes for the upright platens 106 and 108 are indicated at 421—429. These tubes are connected at their lower ends directly to the drum 36, and they extend through the inclined wall defined by the inclined tube sections 86 through openings formed by the bending of certain of the inclined tube sections of this wall out of the plane of the wall. Specifically, Fig. 6 shows the tube 429 bent out of the plane of that wall and extended upwardly as the left hand tube of the platen 106. At the top of each of these platens, the forward tubes such as 429 and 428 are united with tubes such as tubes 430 of the inclined base of the downflow pass 46 by Y-connectors such as 432. The tube 430 continues in alignment with the inclined tube sections 94 which are spaced to provide for the interposition of the remaining tubes 424—427 of the platen 106 between adjacent inclined tubes sections 94. Certain of the latter such as 94' and 94" (Fig. 7) are united by a Y-connector 434 to a single tube 94''' which is bent laterally to provide the openings through which the upper ends of the tubes 424—427 extend. Just above the plane of the base of the downflow pass as defined by the tube sections 94, the platen tubes 424—427 are bent to the left as indicated in Fig. 6 where they continue as the tubular sections such as 104 through the Y-connectors 96 to the upright division wall tubes 98 (Fig. 6).

The separate tubes 420—425 of the platens 108 are arranged with reference to the wall defined by the inclined tube sections 94 in much the same manner as the individual tubes of the platens 106, just described. The platen tubes 420 and 421 are united at their upper ends by the Y-connectors 440 to a single tube 442 which is then bent to the left to extend into the plane of the inclined tube sections 94, space being provided for this tube 442 by the remainder of the platen tubes 422—425 by Y-connectors 444 uniting parts of two of the tubes 94 as indicated at 446 and 448 (Fig. 7).

As clearly shown in Fig. 6, the lower ends of the tubes 420—429 of the platens 106 and 108 form a slag screen 107 beyond the slag screen 34 and the tube rows of the slag screen 107 are distributed on relatively wide spacings across the gas flow upwardly through the lower part of the furnace chamber, as are the tube rows of slag screen 34.

Figure 4:
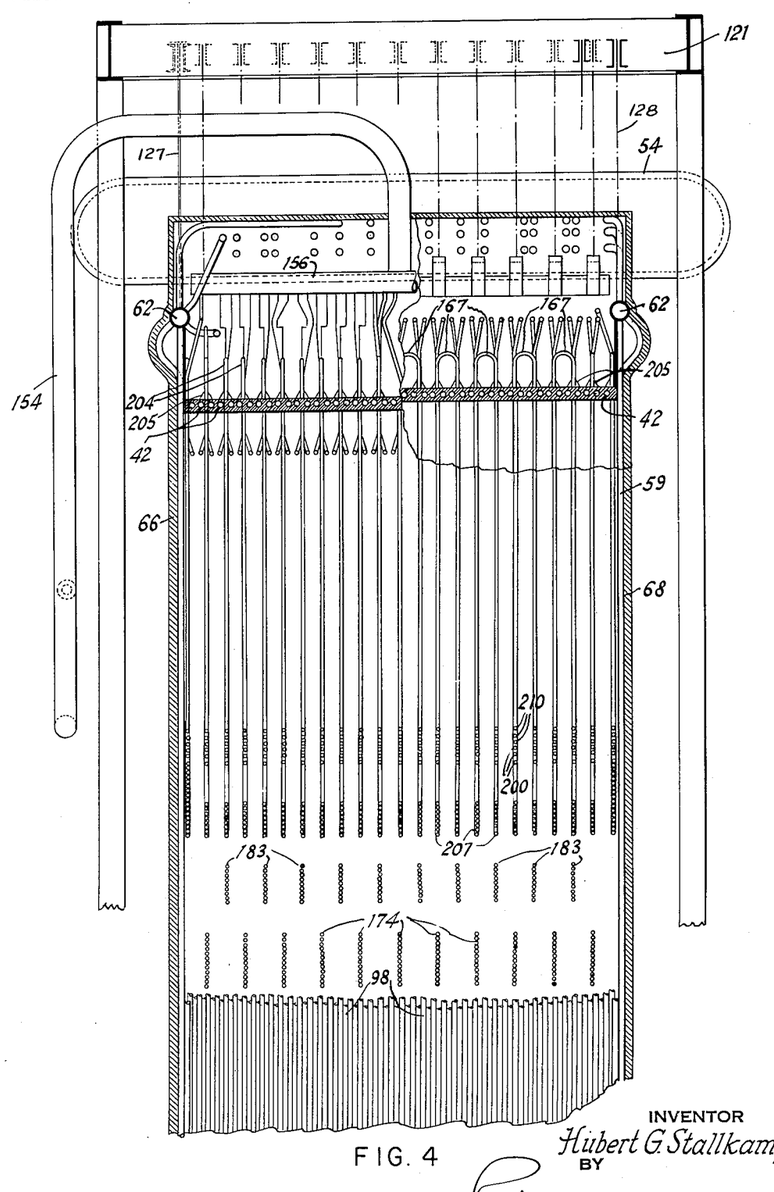
Fig. 4 is a vertical section generally on the line 4—4 of Fig. 2, but with a part broken away to show a partial section on the line 4A—4A of Fig. 2.
Figure 5:
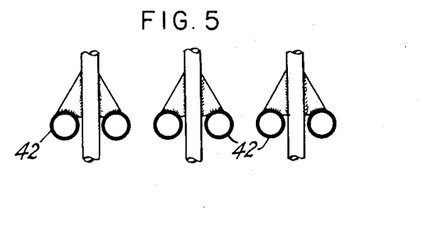
Fig. 5 is a fragmentary view illustrating the manner in which the tubes of the upright superheater platens are supported from the roof tubes at the top of the secondary furnace chamber.

The front wall 40 of the secondary furnace chamber 44 and the forward portions of its side walls 66 and 68 include large diameter risers such as 110—112 of the wall cooling system for the cyclone furnace. These large diameter risers are connected to the left hand portions of side wall headers 62, these portions being separated from the remainders of the headers by diaphragms 63. Some of these risers have sections such as 114 extending upwardly from an upper cyclone header 116 which is fed by substantially semi-circular tubes extending around the cyclone to a lower header 118, the latter being in communication by tubular connectors 120 with the drum 36. All of the above indicated risers, steam generating tubes or wall tubes are pendently supported from horizontally disposed steelwork such as 121 which is, in turn, supported by columns 122 and 124. Some of the pendent supports from the steelwork are directly connected to tubes as shown at 126 (Fig. 1) and other supports are connected to headers as indicated at 127 and 128 (Fig. 4). Many of the tubes are directly supported from the drum 54 which has the pendent supports 130 secured upon elements 132 of the steelwork.

The fluid circulation system of the illustrative installation includes a series of downcomers having their lower ends directly connected to the drum 36 and their upper ends directly connected to the water space of the drum 54. These downcomers are disposed and secured in hollow square arrangement such as indicated at 138 in the upper part of Fig. 1, covered by heat insulating material.

Steam flows from the steam space of the drum 54 through tubular connectors 140 to the upright conduit 142 and through that conduit to the inlet header 144 of the primary superheater including the bank of return bend and series connected tubes 146. From these tubes it flows into the intermediate header 148 and thence upwardly through other banks of return bend tubes which are formed in a manner similar to those of the reheater 100, the reheater and the superheater, above the bank of tubes 146, being separated by metallic division wall 150. From the outlet header 152 of the primary superheater steam flows through a conduit 154 to the inlet header 156 of the secondary superheater which includes a plurality of upright platens formed by series connected tubes and distributed on relatively wide spacings across the gas flow in the upper part of the furnace chamber 44. Water spray heads are associated with a part of the conduit 154 to constitute an attemperator. From the header 156, the steam flows through downwardly diverging rows of tubes 158 and 160. Tubes 158 extend downwardly through the roof of the furnace chamber 44, and thence across the gas outlet of the furnace chamber 44 and then along the wall dividing the upper part of that furnace chamber from the downflow gas pass 46. At the position 162 intermediate the height of this wall, the tubes 158 are fanned out to upright platen formation, forming parts 164 of superheater platens. These may be regarded as rearward extensions of platens 166 which are indicated in Fig. 2. At the lower end of these parts of the upright platen tubes, these tubes are bent to the left as indicated in Fig. 1, and form the lower parts of inclined platens having their lower ends directly connected to the header 168. This header has the lower ends of the superheater tubes 160 also connected thereto.

The superheater inlet tubes 158 enter the header 168 at the lowermost right hand position. With respect to the other tubes connected to that header, the superheater inlet tubes 160 enter the header 168 at a position to the extreme left. Steam flows out of the header 168 through two groups of tubes the lower ends of which are indicated at 170 and 172. These tubes fan out into platen formations where they cross between the steam generating tubes disposed along the wall 40. It will be understood that there are several groups of these tubes along the length of the header 168, and each pair of groups constitutes at least a part of a platen of tubes extending at a horizontal inclination and in platen formation as indicated at 174 in Fig. 1. They continue toward the other side of the furnace chamber 44 and then bend upwardly in platen formation to constitute such platens as those indicated at 166 in Fig. 2. This figure shows a series of parallel platens disposed across the furnace chamber 44. Every other platen is formed by the vertical continuations of the tubes just described. The tubes of these platens 166 extend upwardly between the roof tubes 42 of the installation. Above the roof they have U-bends 167 (Fig. 4) and they return in platen formation between adjacent pairs of roof tubes to form platens such as those indicated at 180 in Fig. 2, the latter being alternately disposed with reference to the platens 166. The steam then flows downwardly through the tubes of these platens to a position such as that indicated at 182, Fig. 1. At this position the tubes of the platens 180 are bent to the left to form the horizontally inclined platens 183 extending across the furnace chamber 44 and then between wall tubes along the wall 40, and thence to positions 184 of connection to the intermediate secondary superheater header 186. From this header steam flows through groups of tubes 188 which are fanned out in platen formation where they pass between wall tubes along the wall 40 at the position 190. From this position, and toward the right, these tubes form parts of horizontally inclined platens 207. At the right hand end of these horizontally inclined parts, the tubes are bent to extend vertically through the roof of the furnace chamber 44, above which the tubes have return bends 192. From these return bends the tubes continue downwardly in platen alignment with adjacent upflow tubes to the position 194 at which they are bent to the left to continue in horizontally inclined platen formation through wall tubes along the walls 40 and to points of connection 196 with the header 198. The upright platens 208 formed by the tubes just described are augmented by other tubes 200, extending from the header 198 between the wall tubes and to a position of platen alignment with the tubes conducting the upflow steam from the header 186 to those conducting the downflow of steam to the header 198. The upright parts of the tubes 200 are indicated at 202. They extend through the roof of the installation above which they have return bends 204. From these return bends, the tubes continue downwardly through the roof and have vertical portions 206 in vertical alignment with the adjoining tubes to form the platens indicated at 208 in Fig. 2. These are uniformly distributed across the width of the upper part of the furnace chamber 44 as clearly indicated in the drawings. Steam flows from the last mentioned tubes 206 through their horizontally inclined parts 210 between adjacent wall tubes along wall 40 to points of connection with the header 212, The flow continues from this header through the conduit 214 to a point of use.

In the illustrative installation, the steam flows from the conduit 214 to a multiple turbine installation from a part of which the expanded steam flows at lower pressure and lower temperature into the inlet header 216 of the reheater, or reheat superheater. From this header, the steam flows through banks of tubes 218—221 of series connected return bend tubes vertically and horizontally spaced and disposed across the downward flow of gases in the down-pass 46. From the tubes of the last of these banks of tubes 221, steam flows into the outlet header 224 and thence to a succeeding component of the turbine installation.

The drawings further disclose an air heater 230 including a bank 232 of horizontally spaced vertically disposed tubes extending through an intermediate baffle 234, and arranged for the upward flow of furnace gases therethrough from the dampered gas outlet 78 at the lower end of the downflow gas pass 46. Air to be heated flows externally and recurrently transversely of these tubes.

The structure near the base of the air heater includes the breeching 236 and the dust hopper 238 which unite to form an enclosed passage for the furnace gases from the lower part of the gas pass 46 to the inlets of the air heater tubes 232.

For the purpose of controlling the superheat, particularly over a wide load range, the illustrative installation includes a recirculated gas system including means for recirculating a portion of the furnace gases from the recirculated gas inlet 240, just below the air heater, through the external duct 242 to the ductwork 244 leading to the inlet of the fan 246. The air outlet of this fan is connected to ductwork 248—251 communicating with the lower part of the furnace chamber 44 along one or both of the side walls of the installation. The amount of recirculated gas is preferably controlled automatically in response to one or more variables such as final superheat temperature, steam pressure, and firing rate of the fuel burning means, to effect a uniform optimum degree of superheat over a wide load range, extending from a value near full load to a fraction thereof. While the control of primary superheat is effected by control of the rate of flue gas recirculation to maintain a predetermined superheat over a wide load range, as indicated above, further control of superheat is effected by the readjustment between the flow of furnace gases to the superheater and the reheater in different portions of the downflow pass 46. This readjustment is effected by control of the dampers positioned at the lower end, or outlet, of that part of the downflow pass containing the reheater 190.

For heat insulation purposes, the headers, circulators, and parts of their steam generating and steam conducting tubes disposed above the roof of the installation are disposed within an enclosure including a superposed cover 256, a front wall 258, and corresponding side walls. The rear wall of this enclosure is formed by the upper extension of the wall 72.

To obtain the high degree of superheat of the illustrative installation, the superheater platens are disposed in a gas zone which has a temperature higher than the slagging temperature of the fuel, and these platens are disposed at such wide spacing that there is only a remote possibility of slag building up upon the platens until it extends across from one platen to the other. In this respect it is to be noted that the groups of platens 174 and 183 are on wide spacings, with their spacing about double the spacing of the superposed groups of platens 207 and 210. Also, the lowermost tubes of the platens 174 are formed by parts of the tubes 158 extending downwardly from the inlet header 156 of the secondary superheater. Therefore, these lowermost tubes of the platens 174 are conducting steam at a temperature lower than the temperature of the steam in the tubes of the superposed platens, and at a temperature lower than the remaining parts of the platens 174. Both of these conditions, as to spacing the tubes and as to the temperature of the fluid within the tubes, promote cooling of the gases and their suspended solids to temperatures at which the latter will not stick to the tubes and accumulate thereon. After the temperature of the gases are lowered by widely spaced platens 174 and 183, the gases contact the platens 207 and 210 which are arranged safely with narrower spacing, about one-half the spacing of the lowermost sets of platens. The spaced platens of the installation effect a high rate of heat absorption. Ninety percent or more of the total heat absorbed is transmitted by radiation and the remainder by convection.

The platens permit a greater area of heat absorbing surface than could be economically arranged as a radiant superheater consisting of furnace wall tubes or other furnace boundary surface tubes. Furthermore, the exposure of the tubes of the secondary superheater to uniform heat effects on all sides of the tubes results in the most effective use of the expensive steel alloys required in superheaters for attaining the high temperatures involved. By the application of heat to all sides of the superheater tubes, the temperatures throughout the peripheries of the tubes are substantially the same, and metal stresses due to temperature differentials in the tubes are thereby minimized.

Furthermore, the "dog leg" arrangement of the tubes forming the platens of the superheater permits effective support at the upper ends of the platens. It also permits draining of the superheater to the lower end junction header outside of the furnace wall tubes. This arrangement also eliminates substantial metal stresses which would occur in other arrangements. This is accomplished by the angular arrangement of the individual superheater tubes with the intermediate or "dog leg" parts being relatively free to move as a result of temperature changes without imposing substantial stresses upon the supports for the tubes.

Among the characteristics of the illustrative installation is the fact that there is no bank of convection heated tubes in front of the platens of tubes of the secondary superheater. The latter are disposed in a zone which, in many cases, would be otherwise a part of the furnace. This part of the furnace, or furnace chamber, is not a combustion chamber, because the combustion is complete before the zone of the superheater platens is reached. The zone of these platens is, however, a zone in which ash particles are in a plastic stage as a result of the high temperatures.

The above described vapor generating and superheating unit involves a vertically elongated setting of generally rectangular section. This setting has its walls defined by vapor generating tubes with other similar tubes separating the upflow gas pass formed by the secondary combustion chamber 44 from the downflow convection gas pass 46 which includes the primary superheater 221. This setting has the front wall 40 and rear wall 70, and the connecting side walls 66 and 68.

It is to be understood that terms and expressions used herein are used by way of example, and not of limitation. The installation is shown and described as a steam generating and steam superheating installation, but in this case the term steam is to be taken as an example of an elastic fluid capable of the same generation and treatment for power or other industrial uses. Where the term water is used, it is to be taken as an example of a vaporizable fluid.

Similarly, the cyclone furnace is to be taken as an example of a fuel burner or fuel burning means firing the installation at temperatures above the fusion temperature of the ash content of the fuel.

What is claimed is:

1. In a vapor generating installation, upright vapor generating tubes defining the walls of a secondary furnace chamber and its refractory lined hopper-like bottom, a cyclone furnace including a cyclone combustion chamber and a primary furnace chamber from which high temperature furnace gases are discharged upwardly into the hopper-like bottom of the secondary furnace chamber, vapor generating tubes defining the walls of the cyclone and the primary furnace chamber, and a fluid circulation system including upper and lower drums as well as downcomer connections and the vapor generating tubes above specified, some of the first mentioned vapor generating tubes having inclined sections covered by refractory to form an inclined wall of said hopper-like bottom, others of the first mentioned vapor generating tubes extending transversely of the above mentioned hopper bottom inclined sections in platen formation and then continuing along a wall separating the lower part of the secondary furnace chamber from the primary furnace chamber, said tubes in platen formation forming a plurality of widely spaced platens distributed across the flow of combustion products upwardly from the lower part of the primary furnace chamber and into said hopper-like construction, others of the vapor generating tubes extending directly from the lower drum in platen rows between adjacent tubes of said inclined wall of said hopper-like construction and first forming inclined platens distributed across the gas flow upwardly through said hopper-like construction and from the gas outlet of the primary furnace chamber and then continuing as upright platens distributed across the gas flow in the lower part of the secondary furnace chamber, some of the tubes of the last mentioned upright platens having their upper ends connected by bifurcations to larger diameter upright wall tubes along a wall of the secondary furnace chamber, others of the upright tubes of the last mentioned platens extending between adjacent furnace chamber wall tubes and being united in pairs by Y-connectors with individual larger diameter tubes of a wall of the secondary furnace chamber at a higher level position.

2. In a vapor generating installation, upright vapor generating tubes defining the walls of a secondary furnace chamber and its refractory lined lower part, a cyclone furnace including a cyclone combustion chamber and a primary furnace chamber from which high temperature furnace gases are discharged into the lower part of the secondary furnace chamber, vapor generating tubes defining the walls of the primary furnace chamber and the cyclone combustion chamber, and a fluid circulation system including upper and lower drums as well as downcomer connections and the vapor generating tubes above specified, some of the first mentioned vapor generating tubes having lower sections covered by refractory to form a lower part of the secondary furnace chamber wall, others of the first mentioned vapor generating tubes extending transversely of the above mentioned lower sections and the lower part of the secondary furnace chamber in platen formation and then continuing along a wall separating the lower part of the secondary furnace chamber from the primary furnace chamber of the cyclone furnace, said tubes in platen formation forming a plurality of widely spaced platens distributed across the flow of combustion products upwardly from the lower part of the primary furnace chamber and into the lower part of the secondary furnace chamber, others of the vapor generating tubes extending directly from the lower drum in platen rows between adjacent tubes of the wall of the lower part of the secondary furnace chamber and first forming inclined platens distributed across gas flow and from the gas outlet of the secondary cyclone furnace chamber and then continuing as upright platens of upright tube sections distributed across the gas flow in the secondary furnace chamber, some of the tubes of the last mentioned upright platens having their upper ends connected by bifurcations to larger diameter upright wall tubes along a wall of the secondary furnace chamber, others of the upright tubes of the last mentioned platens extending between adjacent secondary furnace chamber wall tubes and being united in pairs by Y-connectors with individual larger diameter tubes of a wall of the furnace chamber at a higher level position.

3. In a vapor generating installation, upright vapor generating tubes defining the walls of a secondary furnace chamber, a cyclone furnace including a cyclone combustion chamber and a primary furnace chamber from which high temperature furnace gases are discharged into the lower part of the secondary furnace chamber, vapor generating tubes defining the walls of the cyclone combustion chamber and the primary furnace chamber, and a fluid circulation system including upper and lower drums as well as downcomer connections and the vapor generating tubes above specified, some of the first mentioned vapor generating tubes having lower parts covered by refractory at the lower part of the secondary furnace chamber, others of the first mentioned vapor generating tubes extending transversely of the refractory covered tube parts in platen formation and then continuing along a wall separating the lower part of the secondary furnace chamber from the primary furnace chamber, said tubes in platen formation forming a plurality of widely spaced platens distributed across the flow of combustion products, others of the vapor generating tubes extending from the lower drum between the adjacent refractory covered tube parts and first forming inclined platens distributed across upward gas flow through the lower part of the furnace chamber and then continuing as upright platens distributed across the gas flow in the furnace chamber, said platen rows being disposed at a level above the level of the first platens.

References Cited in the file of this patent

UNITED STATES PATENTS

| | | |
|---|---|---|
| 1,842,235 | Barnes | Jan. 19, 1932 |
| 2,291,730 | Krug et al. | Aug. 4, 1942 |
| 2,333,110 | Loughin | Nov. 2, 1943 |
| 2,357,301 | Bailey et al. | Sept. 5, 1944 |
| 2,424,476 | Marshall | July 22, 1947 |
| 2,513,328 | Jacobs | July 4, 1950 |

FOREIGN PATENTS

| | | |
|---|---|---|
| 598,141 | Great Britain | Feb. 11, 1948 |

OTHER REFERENCES

Central Station Boilers, copyright 1949, B & W Bulletin G-67. (Copy in Div. 46.)

Power Article, March 1949, vol. 93, No. 3, pgs. 72-75. (Copy in Scientific Library.)